April 30, 1935. J. R. BARNHART 1,999,858
TUBE TESTER
Filed April 23, 1934   2 Sheets-Sheet 1

INVENTOR
JOB R. BARNHART
BY
Buckett, Hyde, Higley & Meyer
ATTORNEYS

April 30, 1935.  J. R. BARNHART  1,999,858
TUBE TESTER
Filed April 23, 1934   2 Sheets-Sheet 2
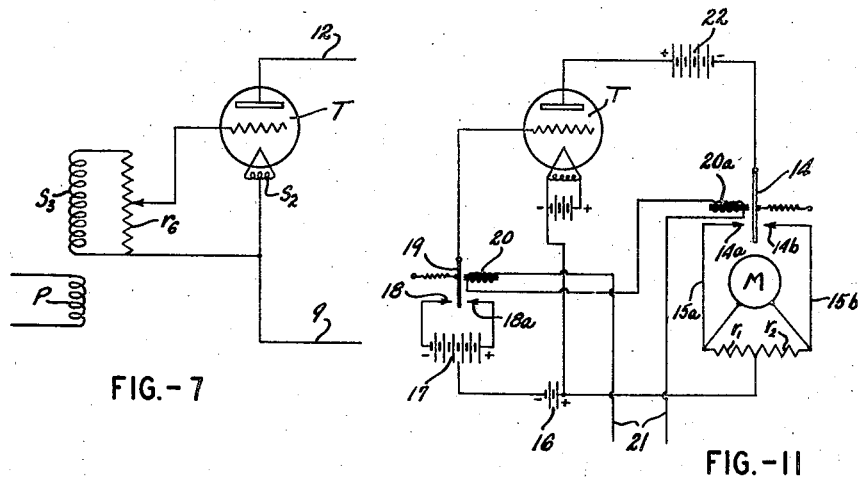
FIG.-7
FIG.-11
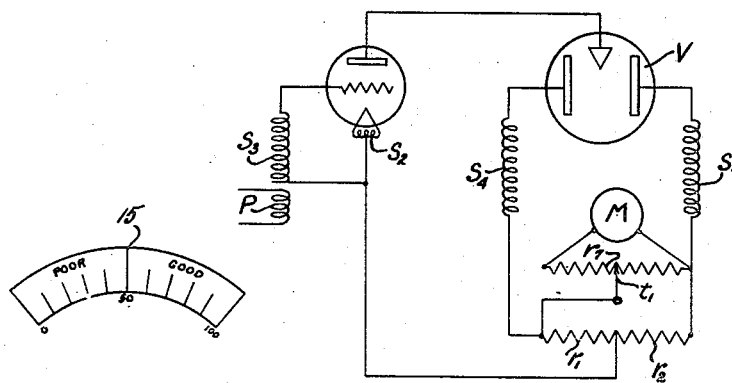
FIG.-9
FIG.-8
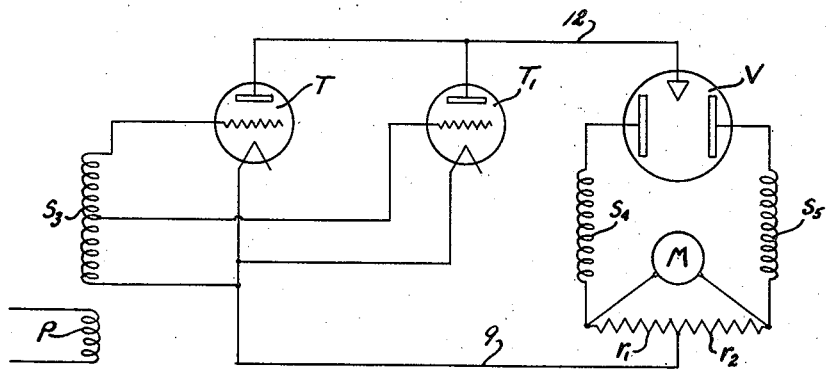
FIG.-10
INVENTOR
JOB R. BARNHART
BY
Brockett, Hyde, Higley & Meyer
ATTORNEYS Patented Apr. 30, 1935

1,999,858

UNITED STATES PATENT OFFICE 1,999,858

TUBE TESTER

Job R. Barnhart, Lakewood, Ohio

Application April 23, 1934, Serial No. 721,883

6 Claims. (Cl. 250—27)

This invention relates to apparatus for the measurement and/or indication of mutual conductance of vacuum tubes. The object of the invention is to provide improved apparatus and method by which mutual conductance may be accurately measured and directly indicated in absolute units, such as micromhos, or on a comparative scale with reference to some standard value of mutual conductance, all by a method which utilizes an instrument sensitive to or actuated by direct current, whether the apparatus is designed for alternating or direct current, as a consequence of which the apparatus is of simple form and may be made and sold at low cost.

A further object of the invention is to provide apparatus including a direct current measuring instrument included in apparatus and operated by a method in which said instrument, when coupled or connected to a vacuum tube to be measured, is insensitive to or not affected by the normal variations in the current to which it is subjected, but is sensitive to and affected by variations or fluctuations in said current as the result of a signal or signaling effect imparted to the tube to be measured, so that such a system or apparatus may be utilized for the measurement and indication of mutual conductance.

A further object is to provide apparatus of this kind, in which a direct current measuring and indicating instrument can be made to directly measure and indicate mutual conductance without special manipulations of the apparatus or the necessity for calculation.

Further objects of the invention are in part obvious and in part will appear more in detail hereinafter.

In the drawings, Fig. 1 represents a diagram of one form of apparatus suitable for the invention; Fig. 2 is a similar diagram indicating a modified form of rectifying tube; Fig. 3 is a similar diagram illustrating a modified form of indicating instrument; Figs. 4, 5, 6 and 7 are detail views, corresponding to Fig. 1, and illustrating different arrangements of means for producing or varying grid bias; Fig. 8 is a similar view illustrating still other modifications; Fig. 9 is a detail view of one form of scale for the measuring instrument; Fig. 10 is a diagram illustrating a multiple arrangement; and Fig. 11 is a diagram illustrating another form of the apparatus designed for operation by direct current.

The invention is adapted for the measurement of mutual conductance in any kind of vacuum tube containing any or all of the usual elements of such a tube, such as the filament or cathode, hereinafter referred to as the filament, the plate or anode, hereinafter referred to as the plate, together with a control grid, screen grid or any other element or combination of elements. Further, for convenience, in that portion of this specification descriptive of operation, the electronic current will be referred to as flowing from the filament to the plate of the tube to be tested, although conventional language usually refers to the flow of current as in the opposite direction.

The tube to be tested is tested "in operation", that is to say, during that kind of operation to which it is customary to subject a tube in tube testing or checking devices of this general class, to-wit, during the energization of such of its elements as are necessary or desirable for the test in a manner approximating their energization for any useful purpose.

In the operation of this testing device the tube to be tested has its plate circuit provided with two paths and associated with suitable means for causing the plate current to traverse the two paths with unidirectional flow in each path and with pulsations alternating in the two paths, together with means for exciting the grid with a signaling effect, and a galvanometer type instrument sensitive to the difference between the currents flowing in the two paths. Either direct or alternating current may be employed, but in either case, with no signal impressed upon the grid, the current effects of the two paths upon the instrument balance and no indication is produced, but when a signal is applied, the currents in the two paths produce different effects upon the instrument and the difference between them is directly proportional to mutual conductance, as will more fully appear hereafter. For convenience and in no sense of limitation, the alternating current form of the apparatus will first be described.

The tube T to be tested embodies the usual elements, to-wit, a filament 2 energized by a secondary coil $S_2$, a plate or anode 3 and a grid 4. The grid circuit is provided with suitable signaling or energizing means, such as coil $S_3$. Tube T to be tested is in a circuit which includes the meter or measuring instrument M across a divided resistance, the parts $r_1$ and $r_2$ of which join at the point 8 where they are both connected by a wire 9 to the mid point of $S_2$. Meter M is of the galvanometer type and indeed may be an ordinary galvanometer, in the sense that as usual it is so constructed and arranged that its needle or movable part deflects in one direction when the instrument is energized by current of one polarity and deflects in the opposite direction if the current is of opposite polarity. Opposite sides of the meter are connected through coils $S_4$, $S_5$ to suitable rectifying means, such as to the plates or anodes 10, 10a of rectifying tube or electronic valve V, the cathode 11 of which is connected by a wire 12 to the plate 3 of the tube to be tested. The arrangement is quite like that of a Wheatstone bridge, with the meter connected crosswise between the four circuit segments with $S_4$ and $r_1$ in one branch and $S_5$ and $r_2$ in the other branch.

Fig. 1 of the drawings shows a primary coil P which it will be understood is connected to any suitable source of alternating current and which in all alternating current arrangements illustrated constitutes the energizing winding for all of the several secondaries $S_2$, $S_3$, $S_4$, $S_5$, by division or subdivision of the primary in the usual manner. For convenience of illustration but a single primary is shown not only in this but in other views of the drawings.

When the apparatus illustrated in Fig. 1 is made up as an indicating instrument, such instrument will comprise a suitable casing in which are mounted the meter M, resistances $r_1$, $r_2$, and coils P, $S_2$, $S_3$, $S_4$, and $S_5$, together with suitable sockets to receive the rectifying tube and the tube to be tested. Coils $S_4$ and $S_5$ are so formed as to produce equal voltages and are wound in such directions that in operation, when the anode 10 is positive, the anode 10a is negative, and vice versa. Moreover, winding $S_3$ is so arranged, for example, that when the anode 10 is positive that terminal of winding $S_3$ which is connected to the grid is negative and vice versa. Resistances $r_1$ and $r_2$ are assumed to be equal.

In describing the operation, let us assume first that the signaling coil $S_3$ is omitted from the circuit. Then when the primary P is energized by a source of alternating voltage, secondary $S_2$ becomes energized and heats the filament of the tube to be tested, causing an emission of electrons. At the same time coils $S_4$, $S_5$ are energized and anodes 10, 10a become alternately positive and negative.

Considering first the half cycle during which the anode 10 is positive, electronic current then flows from the filament 2 to the plate 3, thence to cathode 11, thence to anode 10, through winding $S_4$ to the point 13, then dividing, part going through the meter M and resistance $r_2$, and the other part going through the resistance $r_1$ to the point 8, thence to the mid point of the coil $S_2$, and thence to the filament, completing the circuit. The current flowing through the meter M flows from left to right in Fig. 1, causing a deflection of its pointer, say, to the left. Assuming that the resistance of the meter M is $R_m$, then the value of the current flowing through the meter, from Ohm's law, is (1) $$I\left(\frac{r_1}{r_2+r_1+R_m}\right)$$

Considering now the other half cycle, during which the anode 10a is positive, the electronic current flows from the filament 2 to the plate 3, thence to the cathode 11, thence to anode 10a, thence through secondary $S_5$ to the point 13, where the current divides as before, part flowing through the meter M from right to left and through resistance $r_1$, and the other part flowing through resistance $r_2$ to the point 8 and thence back to the filament. In this instance the current flows through the meter from right to left, causing a deflection of the meter, say, to the right. Again, the value of the current flowing through the meter, from Ohm's law, is (2) $$I\left(\frac{r_2}{r_2+r_1+R_m}\right)$$

Since $r_1$ and $r_2$ have been assumed to be equal, the two expressions (1) and (2) are equal and the deflection of the meter to the left is equal to its deflection to the right. Since the alternations in potential supplied to the anodes 10, 10a are rapid in the case of commercial alternating supply lines, the inertia of the moving part of meter M prevents such part from actually following the alternating impulses. To the eye the pointer of the meter will stand still. Therefore, when the grid of the tube is not subjected to a signaling effect, the meter M will remain at rest without sensible movement of its moving element.

Let us now assume that the secondary $S_3$ is included in the circuit and is energized by the primary P. It has been assumed that the instant when the anode 10 is positive the anode 10a is negative, and that that terminal of winding $S_3$ which is connected to the grid is also negative. Then, when current flows through the winding $S_4$ and anode 10 is positive, the grid 4 of the tube is negative with respect to the filament. The current in this case consequently will be less than in the case before described where the winding $S_3$ is omitted from the circuit. The current through the meter is now (3) $$(I-\Delta I)\left(\frac{r_1}{r_2+r_1+R_m}\right)$$

Likewise, when the anode 10a is positive, that terminal of the winding $S_3$ which is connected to the grid is also positive. Therefore, when current flows through winding $S_5$ the grid 4 becomes positive with respect to the filament and the current is increased over that flowing during the first half of the cycle. The current flowing through the meter now is (4) $$(I+\Delta I)\left(\frac{r_2}{r_2+r_1+R_m}\right)$$

For convenience, let $$\left(\frac{r_2}{r_2+r_1+R_m}\right)=h$$

The difference between (3) and (4) is (5) $$(I+\Delta I)(h)-(I-\Delta I)(h)=2\Delta I(h)$$

Unbalancing of the two currents in opposite directions through the meter causes a sensible deflection of the meter in one direction or the other, and such deflection is proportional to the difference between the currents in opposite directions, or to $\Delta I$.

$$\text{Mutual conductance} = \frac{\text{change in plate current}}{\text{change in grid volts}}$$

Let $Gm$ = mutual conductance $Es$ = change in grid volts $Es$ = voltage generated across winding, S.

$\Delta I$ = change in plate current.

Then $EsGm = \Delta I$ and $2EsGm = 2\Delta I$ whence $$Gm = \frac{2\Delta I}{2Es}$$

The total change in grid volts is twice the voltage developed across the winding $S_3$, or $2E_s$, and the total change in plate current is $2\Delta I$. Factor $h$ in Equation (5) modifies actual deflection of the meter but does not change or affect the proportionality.

Therefore, the deflection of the meter M in one direction or the other is proportional to the mutual conductance of the tube T. The scale of meter M therefore may be calibrated to read directly in standard units, such as micromhos.

The same result may be secured by an arrangement such as shown in Fig. 3, where the moving element of the meter $M_1$ is differentially wound, electric current flowing through winding $S_4$ and coil $C_1$ tending to deflect the meter, say, to the left and current flowing through the winding $S_5$ and coil $C_2$ tending to deflect the meter, say, to the right. If the two impulses balance, as when the signaling coil $S_3$ is omitted from the circuit in the manner described in connection with Fig. 1, there is no visible deflection of the meter pointer, but if the signaling coil $S_3$ is included and is energized the pointer of the meter deflects in one direction or the other by an amount proportional to the difference between the two current flows and hence proportional to mutual conductance.

The two coils $C_1$ and $C_2$ of course may be wound on the same frame with the moving element of the meter.

Fig. 1 illustrates an arrangement in which the electronic valve or rectifying tube includes two anodes and one cathode, but such rectifying tube may be of other forms, for example, one containing two cathodes and one anode, as illustrated at $V_1$ in Fig. 2, in which case the circuit arrangement also is as shown in Fig. 2. The operation is substantially the same as in Fig. 1.

A signaling effect such as will actuate the meter may also be produced in other ways than that shown in Fig. 1. For example, Fig. 4 shows an arrangement for imparting initial negative bias to the grid, in which the current generated by the primary P in the winding $S_6$ is rectified by the valve X, then flowing through a resistor $r_3$, developing unidirectional voltage as indicated by the positive and negative signs. The signaling coil $S_3$ operates as before.

In Fig. 5 the electronic current of the tube under test flows through the adjustable resistor $r_4$ and thus produces unidirectional voltage as shown by the positive and negative signs.

Fig. 7 is an arrangement for applying signals of different values to the grid of the tube under test. A potentiometer resistance $r_6$ is connected across the terminals of the winding $S_3$, and by means of the adjustable contact on the resistance various increments of voltage may be selected.

Figure 1:
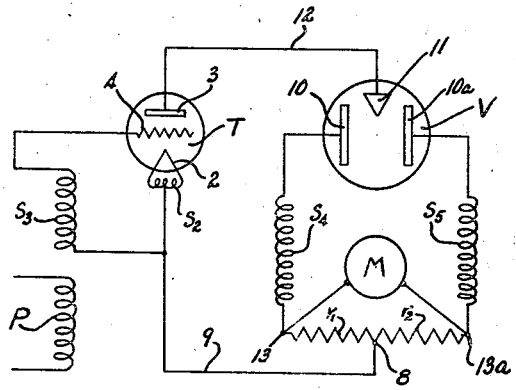
Figure 4:
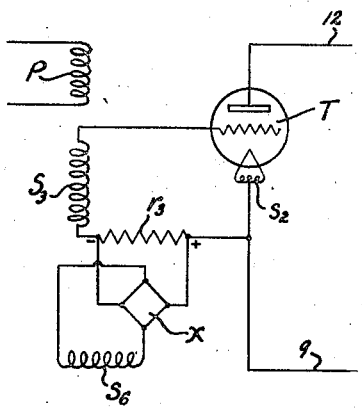
Figure 2:
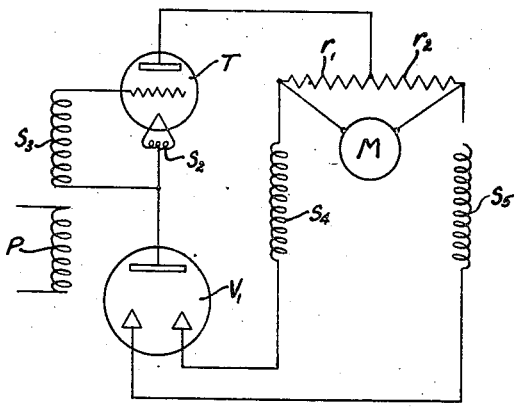
Figure 5:
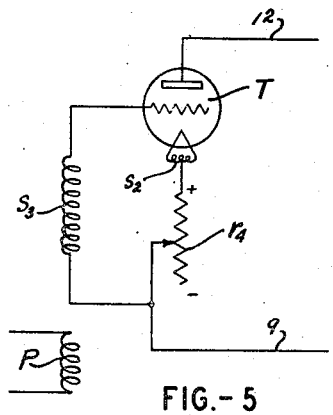
Figure 3:
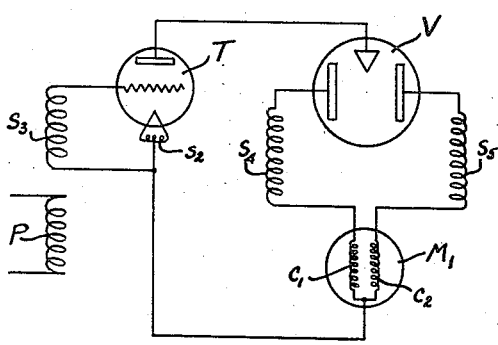
Figure 6:
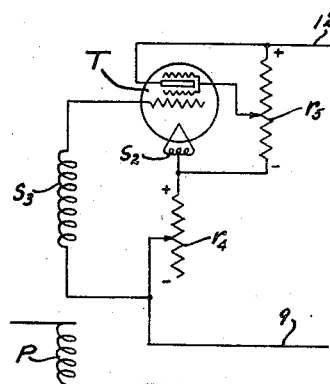
Fig. 6 shows a variation of the circuit shown in Fig. 5. Current through the adjustable bleeder resistance $r_5$ combines with the electronic current of the tube under test in the resistor $r_4$, generating potentials again indicated by the positive and negative signs.

In Fig. 8 is shown a method and apparatus for varying sensitivity of the meter M. The resistor $r_7$ with its adjustable contact $t_1$ forms a shunt combination which may be employed when it is desired to have different values of mutual conductance cause the pointer of the meter to deflect to a given point on the scale. The scale, for example, may be divided into arbitrary divisions, such as "poor" and "good", as shown in Fig. 9.

If it is decided, for example, that a tube which has a normal mutual conductance of 2000 micromhos should be discarded when its mutual conductance has dropped to 1300 micromhos, the contact $t_1$, Fig. 8, is set at a point which will cause the pointer of the meter to deflect to the point 15, Fig. 9, when a tube having a mutual conductance of 1300 micromhos is being tested. Any tube with mutual conductance higher than 1300 micromhos will then cause the pointer to come to rest in the "good" sector, while a tube with mutual conductance lower than 1300 will bring the pointer to rest in the "poor" sector. The actual mutual conductance of any tube can be determined by multiplying the numerical reading on the scale, Fig. 9, by a constant which will vary with the position at which the contact $t_1$ is set and must be known as determined for each setting.

Fig. 10 shows an arrangement for applying signals of predetermined different values to different tube sockets. The instrument includes sockets for two tubes, T, $T_1$, the sockets being connected in parallel to the meter, its resistances and the rectifying tube, and with the winding $S_3$, for developing signal effects in the grid circuits of the two tubes, but the winding is tapped so that full value is imparted to the grid circuit of one tube and half value to another. The winding $S_3$ may be provided with as many taps as different strengths of signal are required, or, if desired, the signals may be taken from a tapped resistor connected across the terminals of winding $S_3$.

Fig. 11 shows one arrangement suitable for use with direct current. The tube T has its plate in circuit with a direct current source 22 and the movable arm 14 of a vibrator interrupter or other form of current commutator, the two contacts 14a, 14b of which are in two paths or branches 15a, 15b connected to the meter M and resistances $r_1$, $r_2$ as shown. The grid circuit may include biasing means, such as the current source 16 and signaling means, such as the current source 17 connected to the contacts 18, 18a of another vibrator interrupter or current commutator, the movable arm 19 of which is connected to the grid.

Suitable means is provided for producing synchronous operation of the two vibrators, either mechanically by operating them from the same movable shaft or, as shown, by subjecting them to the effects of coils 20, 20a both in the same circuit 21, said circuit being supplied with alternating current or with direct current by way of an interrupter (not shown). In any event the vibrations of the two arms 14, 19 must be timed to repeat with sufficient rapidity so that the inertia of the moving pointer of the instrument M will not permit it to follow the alternating impulses, first in one path and then in the other, but said pointer will be responsive only to differences in current flow proportional to mutual conductance, as in the alternating current example before described.

In all of the arrangements described, mutual conductance is accurately measured and may be directly indicated upon the scale of a direct current instrument. Consequently, the apparatus as a whole may be made and sold at low cost as compared with necessarily expensive instruments heretofore required for the purpose. Other advantages will also be apparent to those skilled in the art.

What I claim is:

1. In apparatus for the purpose described, means providing plate and grid circuits for a tube to be tested, said plate circuit including a pair of branches in parallel relation, means for energizing said circuits to provide periodic pulsations coincidently in each, with unidirectional pulsations alternating in said branches, and a meter associated with said branches by interconnection therebetween to be responsive to the difference in magnitude of the pulsations therein caused by those in said grid circuit.

2. In apparatus of the class described, means providing a circuit for the plate of a tube to be tested, said circuit including a pair of branches in parallel relation with each other, each branch including a resistance, means providing unidirectional potential pulsations out of phase in the two branches, means for exciting the grid of said tube with alternating current voltage varying synchronously with the current pulsations in said branches, and a galvanometer arranged in cross connection between said branches and in shunt relation with said resistances.

3. In apparatus of the class described, means providing a circuit for the plate of a tube to be tested, said circuit including a pair of branches in parallel relation with each other, each branch including a source of alternating current potential synchronous with the other branch, and rectifying means, providing pulsations in the two branches of common polarity but out of phase one from the other, a meter arranged in cross connection between said branches, each branch having a resistance and the two resistances being together in shunt relation with said meter, and alternating current means for exciting the grid of said tube with voltage varying synchronously with said current pulsations, whereby instant current flow in either of said branches will have a divided path including one way successively through the meter and one of said resistances, and another way through the other resistance, and said meter will be responsive to the difference in magnitude of pulsations in opposite directions therethrough.

4. In apparatus of the class described, means providing a circuit for the plate of a tube to be tested, said circuit including a pair of branches in parallel relation with each other, each branch including a resistance element and an inductance element, rectifying means arranged to provide unidirectional flow of opposite phase in the two branches from synchronous alternating current excitation of said inductance elements, a third inductance element arranged in a circuit with the grid of said tube, an input inductance element in coupled relation with all of said three inductance elements, and a galvanometer arranged in cross connection between said branches and in shunt relation with said resistance.

5. In apparatus of the class described, means providing a circuit for the plate of a tube to be tested, said circuit including a pair of branches in parallel relation with each other, each branch having means providing alternating current potential synchronous with the other branch, said circuit including a three element rectifying unit arranged to provide unidirectional flow therein, with impulses alternating in said two branches, a galvanometer arranged in cross connection between said branches and in shunt relation with said resistances, and means for exciting the grid of said tube with alternating current voltage varying synchronously with the current pulsations in said branches.

6. In apparatus for the purpose described, means providing plate and grid circuits for the tube to be tested, said plate circuit including a pair of secondary transformer windings in parallel relation, rectifying means associated with one end of each winding, for providing unidirectional flow in both windings, resistor means connecting the other ends of said windings, the tube plate circuit including a connection between the tube and said rectifying means, and a connection between the tube and an intermediate point on said resistor, a meter connected in shunt with said resistor, said grid circuit including a secondary transformer winding, and means for synchronously energizing all of said secondary windings.

JOB R. BARNHART.